United States Patent [19]

Johnson et al.

[11] Patent Number: 4,477,510

[45] Date of Patent: Oct. 16, 1984

[54] DECALCOMANIA

[75] Inventors: Ronald E. Johnson, Tioga, Pa.; Lung-ming Wu, Horseheads, N.Y.

[73] Assignee: Corning Glass Works, Corning, N.Y.

[21] Appl. No.: 427,511

[22] Filed: Sep. 29, 1982

[51] Int. Cl.$^3$ .......................... B32B 3/18; B41M 3/12; B41M 5/26

[52] U.S. Cl. .................................... 428/200; 428/206; 428/207; 428/210; 428/212; 428/216; 428/325; 428/335; 428/347; 428/348; 428/349; 428/484; 428/523; 428/913; 428/914

[58] Field of Search ........................ 156/234, 240, 277; 427/148; 428/200, 206-208, 913, 914, 210, 212-216, 325, 334-337, 339, 343, 347-349, 354, 355, 484, 523

[56] References Cited

U.S. PATENT DOCUMENTS

| | | | |
|---|---|---|---|
| 3,926,707 | 12/1975 | Glaser et al. | 156/240 |
| 4,171,398 | 10/1979 | Hunt | 156/234 |
| 4,280,939 | 7/1981 | Johnson | 260/23 AR |
| 4,292,104 | 9/1981 | Heimbach et al. | 156/235 |
| 4,294,641 | 10/1981 | Reed et al. | 156/240 |
| 4,315,790 | 2/1982 | Rattee et al. | 156/240 |

*Primary Examiner*—Bruce H. Hess

*Attorney, Agent, or Firm*—B. R. Turner

[57] ABSTRACT

A heat release decal, for decorating a shaped surface of an article, is disclosed. The decal includes a stretchable web, a meltable release layer on the web and a design layer thereover. When heated, the release layer melts, thereby releasing the design layer therefrom. When the decal is heated to above the melt point of the release layer, the design layer becomes tacky. The design layer sticks to the article upon intimate contact. The web, the design layer and release layer are formed of materials which do not migrate into each other upon formation of the decal, or upon application to the article. Each are stretchable to allow the decal to conform to the shape of the article to be decorated.

5 Claims, 1 Drawing Figure

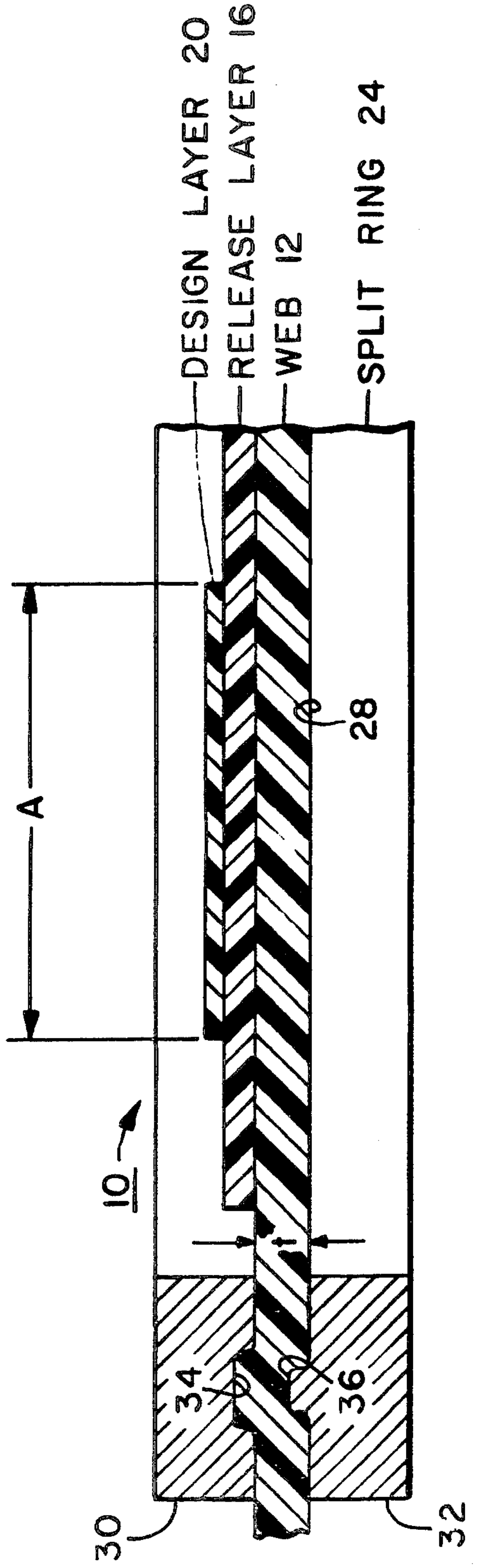
DESIGN LAYER 20
RELEASE LAYER 16
WEB 12
SPLIT RING 24
A
28
10
t
34
36
30
32

DECALCOMANIA

BACKGROUND OF THE INVENTION

The invention pertains to improvements in decalcomania, commonly known as decals. In particular, a stretchable heat release decal is disclosed.

A heat release decal may generally be described as a decal may be placed with the decoration or design in contact with the object to be decorated. When heat is applied, the wax release layer melts and the design separates from the web.

Heat release decals are useful in the decorating industry. They are especially useful for ornamenting dinnerware because they may be made to meet very strict quality standards; they may be mass produced; and they are easily stored and shipped. The most important advantage is that heat release decals may be applied with automated equipment.

Unfortunately, heat release decals do not always work. They do not satisfactorily conform to severely curved surfaces. They tend to distort, wrinkle, and form air pockets with the same.

Conventional water slide-off decals are the most widely used decals because they work on curved surfaces and thereby allow full coverage. However, they are labor intensive, requiring hand application.

Another conventional decal, known as a cold release decal, employs a pressure sensitive ink deposited on a web. Cold release decals require higher transfer pressures than the other decals hereinbefore mentioned. Accordingly, care must be taken when applying such decals to ware so as not to damage the same. Further, both pressure sensitivity of the ink and release properties of the web must be closely controlled.

The main advantage of the heat release decal of the present invention is that it combines the full coverage advantage of water slide-off decals with the advantage of automated application allowed by heat release decals. The heat release decal of the present invention conforms to the ware shape and yet does not suffer the shortcomings of water slide-off and cold release decals. The decal may be applied by machine. The decoration does not release under pressure, but releases upon mere intimate contact and application of heat. Thus, high pressure is not necessary to apply the decal.

Another important advantage of the heat release decal of the present invention is that the decal stretches uniformly to conform to severely curved ware.

The materials forming the web, release layer and decoration have been carefully chosen to prevent intermixing, migration or chemical interaction of the materials with each other, thereby preventing deterioration of beneficial characteristics of such materials.

SUMMARY OF THE INVENTION

A heat release decal for application onto an article is disclosed. The decal is formed of a uniformly stretchable web; a release layer deposited onto said web; and a design layer or decoration deposited on the release layer. The web and the decoration carried thereby may be shaped or stretched to conform the decoration to the article. The decoration releases from the web and sticks to the article upon intimate contact and application of heat.

DESCRIPTION OF THE DRAWING

The drawing is a fragmented illustration in cross-section of a decal of the present invention. The drawing also illustrates a split ring retainer securing the decal for purposes hereinafter explained.

DESCRIPTION OF THE PREFERRED EMBODIMENT

The drawing shows a heat release decal 10 including a backing material or web 12; a release layer 16 deposited on the web 12; and a design layer or decoration 20 deposited on the release layer 16.

The web 12 is a stretchable support or carrier of the release layer 16 and design layer 20. The decoration 20 is applied to the ware or article to be decorated. The release layer 16 holds the decoration 20 onto the web 16. When heat is applied to the decal 10, release layer 16 softens or melts, thereby allowing the decoration 20 to be released therefrom.

In a preferred embodiment, the web 12 is a disposable film of linear low density polyethylene, which best combines the desired characteristics for the web 12 including uniform stretchability and low cost.

Some examples follow:

EXAMPLE I

| Film Properties: | |
|---|---|
| Material | Low Density Polyethylene |
| Tensile Strength | 1000-5000 PSI |
| Elongation | 120-1200% |
| Thickness | 1.5-4 mil |

EXAMPLE II

| | |
|---|---|
| Material | Linear Low Density Polyethylene |
| Tensile Strength | 2000-6000 PSI |
| Elongation | 700-1200% |
| Thickness | 1-2 mil |

Although the invention is workable using the low density polyethylene of Example 1 for the web 12, the preferred embodiment uses the linear form of low density polyethylene in Example II, because this material stretches uniformly in all directions. Thus, when the web 12 stretches, the design layer 20 may be applied to the article without being distorted. Further, the mechanical properties of the linear low density polyethylene such as tensile strength, elongation, and stretchability are more stable or less sensitive to the direction of various apparatus (not shown) used to form it. During manufacture, polymer orientation, which is thought to affect the mechanical properties, does not seem to occur in the linear low density polyethylene.

Preferably, the release layer 16 is formed of a wax applied wet onto the web 12 from a solution of $\frac{1}{3}$ polyethylene glycol ester mixed with $\frac{2}{3}$ ethyl acetate solvent. Drying occurs by evaporation of the ethyl acetate. The wax may be applied as an emulsion with drying occurring by evaporation of water. The wax may also be applied as a molten liquid onto the web 12, whereupon it solidifies. In each case, the release layer 16 is formed of a relatively uniform thin layer approximately 0.25 to 1.5 mil thick. The preferred wax may be a material sold by Union Carbide Co. under the tradename Carbowax, 1540 monostearate having a melt point between approximately 40°–45° C. Waxes having a much lower melt point are not preferred because they tend to melt during printing and handling. Waxes with higher melt points above 70° C. require a longer transfer time. Further, many of the preferred ink formulations employed tend to smear at higher temperatures.

The polyethylene monostearate wax, forming the release layer 16, is preferred because it wets the polyethylene web 12 when it is applied thereon. This is an important property because polyethylene is a difficult material to wet. Another important property of the monostearate wax is that it does not migrate into, or otherwise combine with the polyethylene material forming web 12. This is important, because, if migration occurs, the release layer 16 will not function properly.

The design layer 20 is formed of one or more layers of hot-melt, heat-processable, pressure-sensitive thermoplastic inks. The inks are filled with ceramic frit materials to provide the colors necessary for making up designs. Preferred formulations are disclosed in U.S. Pat. No. 4,280,939. The preferred inks soften with heat; form cohesive films when cooled; become tacky or pressure-sensitive at various elevated temperatures; and do not migrate into the monostearate wax forming release layer 16.

In the present invention, the inks are printed over the wax release layer 16 as a cohesive tacky film. A preferred printing apparatus, which uses a collector, is disclosed in U.S. patent application Ser. No. 173,129 filed 7-28-80. The preferred inks melt above the melt point of the release layer 16 (see U.S. Pat. No. 4,292,104). The preferred inks also must not exhibit any migration into the wax release layer 16. If migration occurs, the ink and wax may each lose the ability to stretch uniformly with the web 20; the ink may lose its adhesion to the wax; and the ink may loose its ability to properly release as an integral film from the wax release layer 16. Once printed onto the release layer 16, the design layer 20 tends to remain adhered thereto. However, when the decal 10 is heated to a temperature above the melt point of the release layer 16, the wax melts, thereby allowing the design layer 20 to be released. Also, at the same time and at near the same temperature that the release layer 16 melts, the inks become tacky and pressure sensitive. Under these conditions, the inks adhere to the ware upon intimate contact. Thus, transfer of the design layer 20 from the web 12 to the ware is facilitated.

The web 12 may be in the form of a continuous sheet, and may be rolled up after the decal is formed. In the preferred embodiment, the design layer 20 is formulated of inks having a greater affinity for the wax release layer 16 than the polyethylene film forming the web 12. Thus, the design layer does not tend to stick to the backside of the web when it is rolled up. Further, the decals 10 are normally shipped and stored at temperatures below which the inks become tacky. Therefore, when polyethylene is used for the web 12, it is not necessary to provide a release coating or parting agent on the backside 28 thereof.

The decal 10 has a print area A. Each decal 10 may be clamped or cut beyond the print area A from a roll or long sheet (not shown). It may be automatically secured in a split ring retainer or holder 24 as shown. The holder 24 has respective upper and lower mating rings 30 and 32. The upper ring 30 has an annular recess 34. The lower ring 32 has an outwardly extending ridge 36 adapted to mate with the recess 34. The ridge 36 and recess 34 cooperate to securely grip the web 12 and tightly hold the decal 10 in tension. Preferably, a resiliant plunger (not shown), but similar to that illustrated in U.S. patent application Ser. No. 332,723 filed 12-12-81, is used to press the decal 10 against the ware (not shown). The plunger engages a backside 28 of the web 12 and deforms it. The design layer 20 of the decal 10 is applied against the ware with moderate pressure. Upon application of heat, the release layer 16 becomes melted and the design layer 20 becomes warm and tacky. The design layer 20 adheres to the ware and is released from the web 12.

Adequate conformation of the decal 10 to the ware occurs because the film forming the web 12 stretches uniformly. The wax release layer 16 and inks forming the design layer 20 are relatively soft materials and stretch when deformed during the application process. Thus, the important advantage of full coverage of the ware is possible. The cost advantage of automated application of heat release decals is also achievable. Further, the cost of the decal 10 is reduced because the linear low density polyethylene, used for the web 12, is relatively inexpensive in comparison to the paper normally used in heat release decals.

The heat required to melt the release layer 16 may be provided by heating the ware prior to contacting the same with the decal 10. It is also possible to separately heat one or both of the decal 10 and the plunger prior to transfer. After the design layer 20 of the decal 10 is printed onto the ware, the deformed web 12 is removed from the holder 24 and discarded.

Materials other than the preferred linear low density polyethylene that have been found useful for forming the web include: rubber, polyethylene, polyvinylchloride, polyurethane and polypropylene. These materials may suffer from one or more drawbacks mentioned herein. However, the materials work with sufficient regularity and economy to be considered part of the invention. In the accompanying table, (+) indicates that the material exhibits the property regularly, and (−) indicates the property is not normally, present. The preferred Linear Low Density Polyethylene exhibits all of the desired properties regularly.

TABLE

| | Material | | | | | |
|---|---|---|---|---|---|---|
| Property | Linear Low Density Polyethylene | Polyethylene | Rubber | Polyurethane | Polyproplene | Polyvinylchloride |
| Parting Agent Not Needed | + | + | − | − | − | − |
| Stiff (Easy to handle) | + | + | − | − | + | + |
| Low Cost | + | + | − | − | + | + |
| Stretchable | + | + | + | + | + | + |
| Uniformly Stretchable | + | − | + | + | − | − |

TABLE-continued

| Property | Material | | | | | |
|---|---|---|---|---|---|---|
| | Linear Low Density Polyethylene | Polyethylene | Rubber | Polyurethane | Polyproplene | Polyvinylchloride |
| No Migration | + | + | + | + | + | − |

The decal 10 of the present invention is versatile, relatively inexpensive and extremely high quality. It solves many of the problems of the prior arrangements and expands the usefulness of decals and design possibilities thereof.

What is claimed is:

1. A heat release decal for application to a shaped surface of an article comprising:

a support web formed of a disposable stretchable film of low density polyethylene having a tensile strength of between about 1000 PSI and 6000 PSI, said web being uniformly stretchable by between about 120% and 1200% and having a thickness of about 1.0 mil to 4 mil;

a release layer, deposited on said support web, formed of an organic wax having a melt point between about 40° C. and 70° C.;

and at least one design layer deposited on said release layer as a cohesive film, formed of heat-processable thermoplastic ink having a melt point higher than that of the release layer;

said thermoplastic ink being formed of a material which, when heated to near the melt point of the release layer, becomes tacky; has an affinity for the surface of the article; and remains cohesive, such that when the decal is heated above the melt point of the release layer, and the design layer is placed in contact with the article, the design layer adheres to the article and releases from the web;

each of the web, the release layer and the design layer of the decal being formed of materials which do not migrate into each other during formation of the decal and upon application to the article;

and the release layer and design layer each being stretchable with the web for conforming with the shaped surface of the article.

2. A decal as set forth in claim 1 wherein the web is a uniformly stretchable film of linear low density polyethylene.

3. A decal as set forth in claim 1 wherein the release layer comprises: a wax formed of a polyethylene glycol ester having a melt point between about 40° C. and 45° C. and being deposited on the web to a thickness of about 0.25 mil to 1.5 mil.

4. A decal as set forth in claim 1 wherein the inks forming the design layer are filled with colored ceramic frits.

5. A decal as set forth in claim 1 wherein the web is formed of a linear low density polyethylene film having a tensile strength of between about 2000 PSI and 6000 PSI; being stretchable by about 700% to 1200% and having a thickness of about between 1 mil and 2 mil.

* * * * *

UNITED STATES PATENT AND TRADEMARK OFFICE

CERTIFICATE OF CORRECTION

PATENT NO. : 4,477,510

DATED : October 16, 1984

INVENTOR(S) : Ronald E. Johnson and Lung-Ming Wu

It is certified that error appears in the above-identified patent and that said Letters Patent is hereby corrected as shown below:

Column 1, between lines 8 and 9, the following phrase is missing -- decoration deposited on a web over a wax release layer. The --.

Signed and Sealed this

*Twenty-fifth* Day of *June 1985*

[SEAL]

*Attest:*

DONALD J. QUIGG

*Attesting Officer* *Acting Commissioner of Patents and Trademarks*